Jan. 19, 1960 W. E. DOBBINS ET AL 2,921,740
BINARY INCREMENTAL SLOPE COMPUTOR
Filed Dec. 19, 1949 4 Sheets-Sheet 1
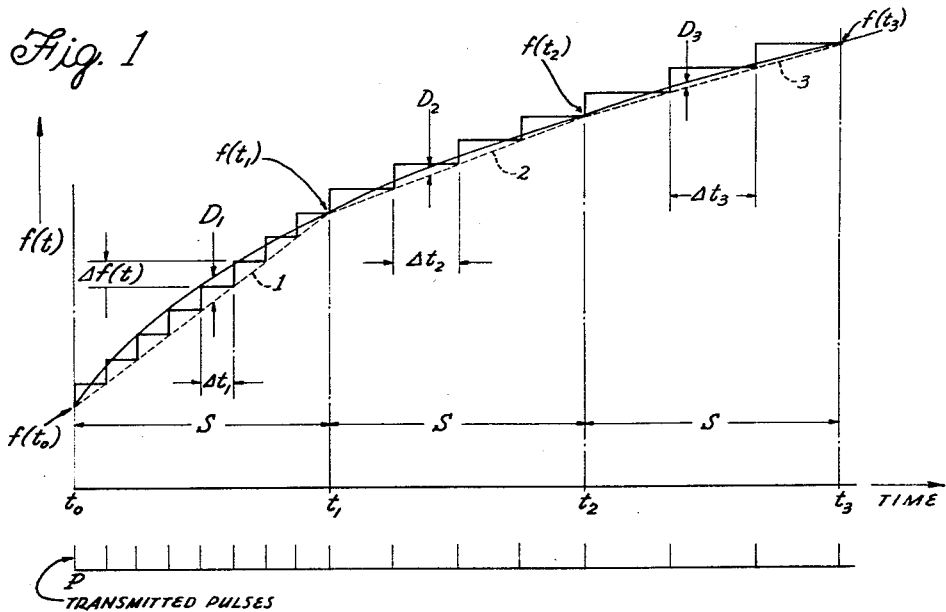
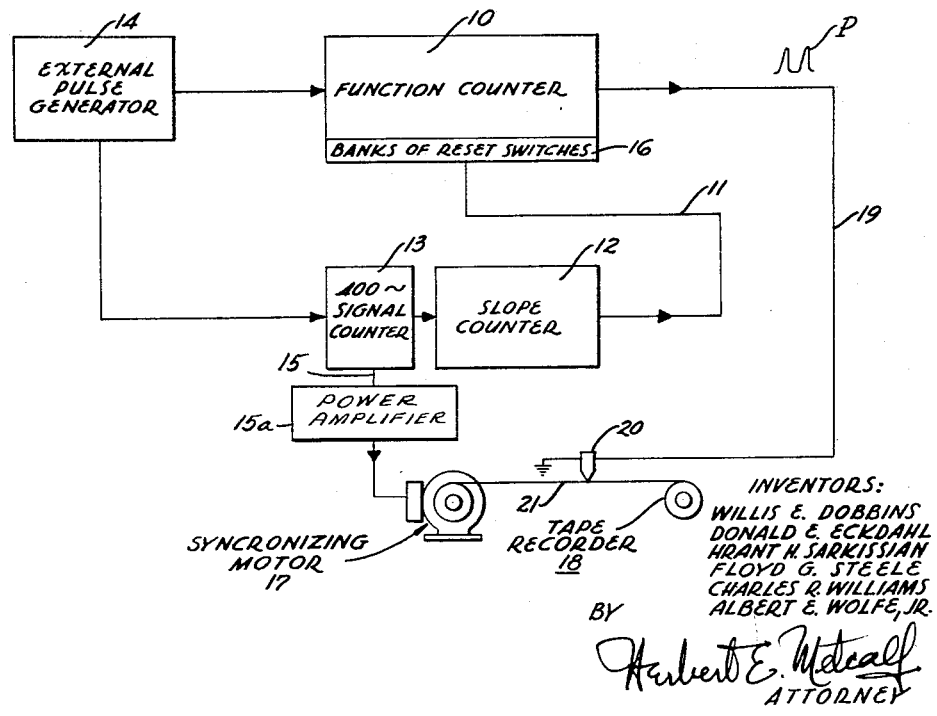
INVENTORS:
WILLIS E. DOBBINS
DONALD E. ECKDAHL
HRANT H. SARKISSIAN
FLOYD G. STEELE
CHARLES R. WILLIAMS
ALBERT E. WOLFE, JR.
BY
Herbert E. Metcalf
ATTORNEY

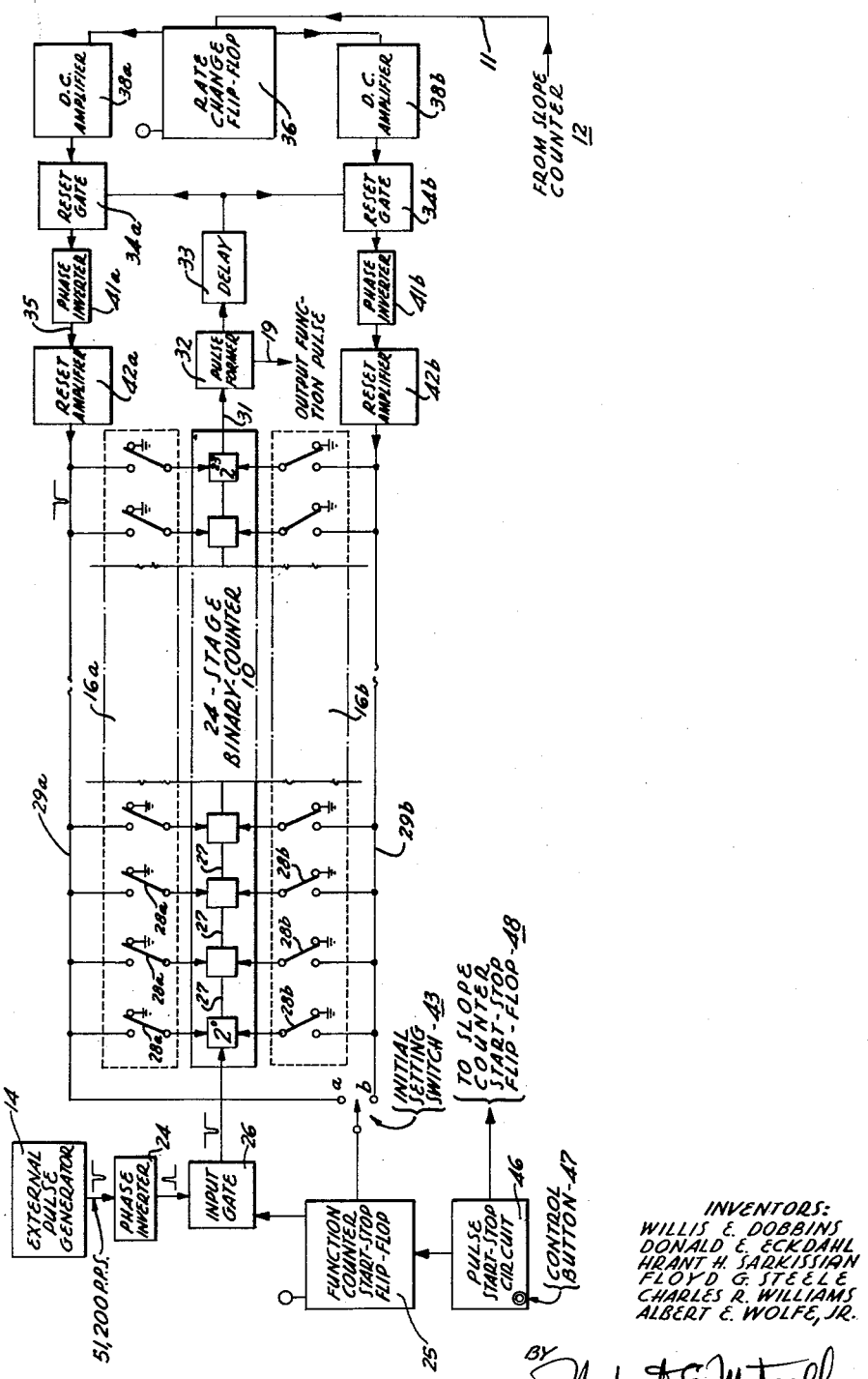

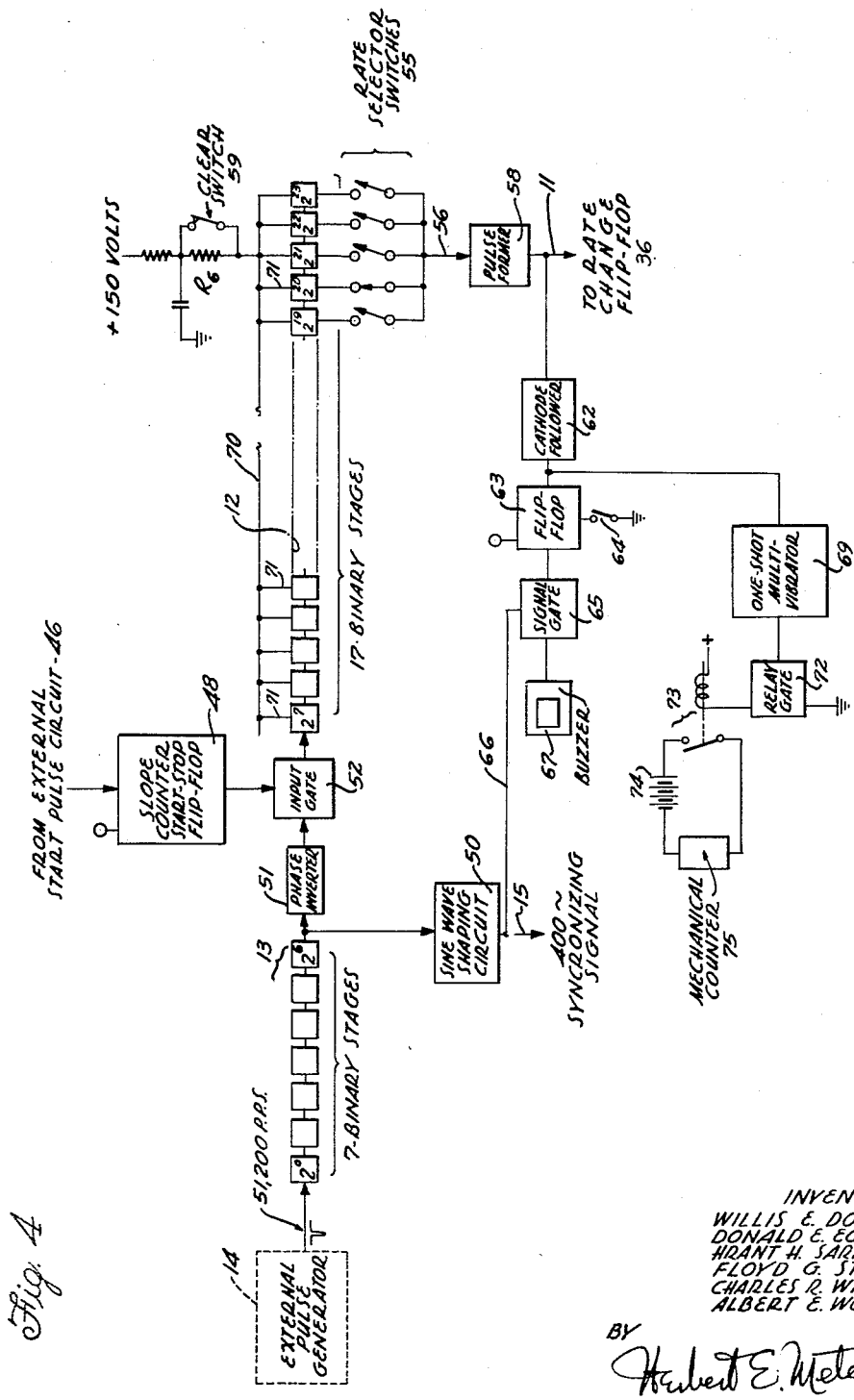

United States Patent Office 2,921,740
Patented Jan. 19, 1960

2,921,740

BINARY INCREMENTAL SLOPE COMPUTER

Willis E. Dobbins, Manhattan Beach, Charles R. Williams, Hawthorne, Hrant H. Sarkissian, Hermosa Beach, Donald E. Eckdahl and Floyd G. Steele, Manhattan Beach, and Albert E. Wolfe, Jr., Compton, Calif., assignors to Northrop Corporation, Hawthorne, Calif., a corporation of California Application December 19, 1949, Serial No. 133,816

16 Claims. (Cl. 235—197)

This invention pertains to digital type function generators and more particularly to an electronic means of generating any function of time, to any desired degree of accuracy, by the use of incremental slopes.

In control systems for the automatic navigation of missiles, for example, it is desirable to maintain a steady flight according to predetermined instructions originating outside of the control mechanism. These instructions, which may be expressed originally in the form of a mathematical equation, or an arbitrary function of time, must be converted into a stream of properly spaced pulses to put the information in a form useful for feeding into the electrical control mechanism which operates to physically establish the desired relationship between components of the system, for example.

It is therefore an object of this invention to provide a novel means of converting a mathematical function of time into an electrical pulse-time representation.

Control instructions or functions used in conjunction with celestial navigation systems, such as, for example, the altitude angle function of chosen stars along a specified trajectory, may be mathematically expressed in the form of differential equations of motion which do not easily yield to direct integration and are not readily solved by ordinary computer elements. In fact, the solution of the differential equations may be of such a nature that particular solutions only can be obtained, for instance, by the use of well known methods of numerical integration. Thus, mathematical expressions for these solutions are very complex and at best can only be approximated.

It is accordingly another object of this invention to provide a means of converting these solutions, no matter how complicated, into a pulse-time representation.

When the differential equations of motion are solved by means of numerical integration methods using available large scale electronic or analogue computers, for example, the data as obtained by such means are a table of values of the desired function at equal increments of the independent variable, time.

Using these data, a method of linear interpolation between the known values of the function, herein defined as a "Method of incremental slopes," is employed in the present invention to generate the desired function as a pulse-time representation.

In general, this method develops a function by first approximating it by a succession of straight lines connected at point solutions for certain values of the independent variable, time. A "stair case" approximation to these straight lines is then made by changing the instantaneous value of the function by fixed increments at time intervals which remain constant for each particular straight line. The rate of occurrence of the fixed increments for each line are made directly proportional to the slope of the line. The fitting of the straight lines to the actual curve may be made as close as desired by increasing the number of them; and the straight lines may be approximated as closely as desired by decreasing the size of the fixed increment representing the changes in the value of the function.

Accordingly it is an object of this invention to provide a means and method of generating a pulse-time representation of any function using incremental slopes.

It is further an object of this invention to provide a means of generating a pulse-time representation of any function to any desired degree of accuracy.

It is still further an object of this invention to provide means for generating a function of time using binary elements for the counters and switches.

Briefly, a preferred system for generating the desired function by means of the method of incremental slopes comprises an external pulse source that feeds pulses into a first binary counter which emits a function pulse each time it fills up and clears. Variation in the rate of function pulse emission is achieved by changing the effective capacity of this counter. The maximum capacity of the first counter is, of course, a constant; its effective capacity is controlled by setting into it an initial base number to which the input pulses add until the counter fills. Upon clearing, the counter emits a function pulse, resets automatically to the base number and immediately starts counting again. A second binary counter, operating also as a rate divider for the input pulse rate from the external pulse source, serves as a slope interval timing device. This second counter counts conventionally from zero and fills to a preselected stage which indicates completion of the particular slope chosen for the function being generated. The second counter emits a pulse which actuates switching means to set a new reset base number in the first counter and thus changes the rate of emission of the function pulses for the next slope.

The actual setting up of the base numbers for the first counter is accomplished through two alternate banks of switching means. During the generation of one pulse rate the operator manually arranges the second switching bank for generation of the succeeding pulse rate. The second counter in effect connects the first counter alternately to these two switching banks.

The function is developed and stored by impressing the function output pulses from the first counter onto a magnetic tape. The desired instructions for the trajectory of the missile is thus recorded on the tape and is made available for later play-back as a pulse-train to the control mechanisms at the time during a missile flight when automatic celestial navigation is desired.

The above recited objects and advantages and others, will be more fully understood by reference to the accompanying drawings illustrating the method and showing a preferred form of the invention in detail.

In the drawings:

Figure 1 shows a graphical illustration of the action of the incremental slope function generator.

Figure 2 is a simplified block diagram of a general set-up of a system utilizing the invention.

Figure 3 is a block diagram of the function counter and its associated control circuits.

Figure 4 is a block diagram of the signal and slope counters and their associated control circuits.

Figure 5:
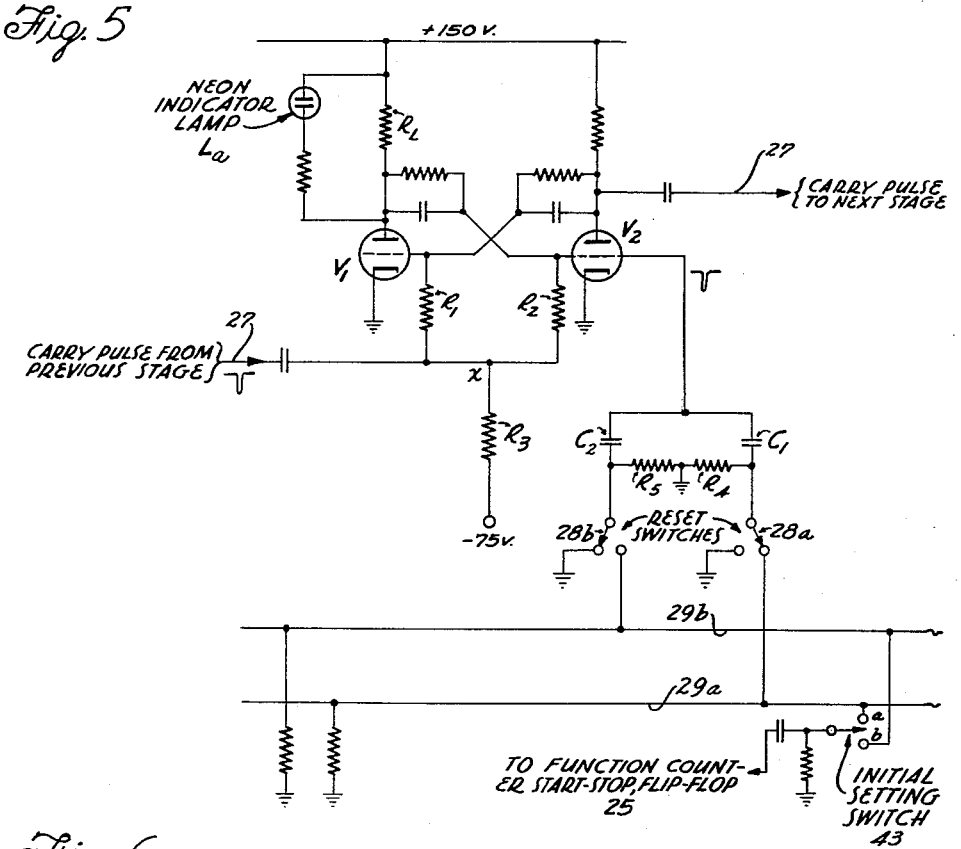
Figure 5 is a detailed schematic drawing of one binary stage of the function counter showing its connections and associated switches.

Referring first to Figure 1, a general function is shown as a solid line plotted against time. Knowing the numerical value of this function at $t_0$, $t_1$, $t_2$, the mathematician can approximate it to any desired degree of accuracy by means of successive straight lines of different slopes which intersect the function curve at these points. Three such straight lines or chords 1, 2, and 3 are shown as dashed lines in Figure 1 between points $f(t_0)$, $f(t_1)$, $f(t_2)$, and $f(t_3)$ of the curve. The maximum deviations of each of the straight lines, 1, 2 and 3 from the actual function are designated $D_1$, $D_2$, and $D_3$. These deviations are taken in a direction parallel to the functions $f(t)$ axis. Thus the maximum of all the deviations D represents the degree of accuracy of the approximation.

The incremental value $\Delta f(t)$ of the function $f(t)$ is arbitrarily selected so that the maximum deviation D is not exceeded by $\Delta f(t)$. Preferably by first specifying $\Delta f(t)$, fixed time intervals S representing the time duration of each of the slopes, are chosen so that nowhere in any time interval does the straight line deviate from the actual value of the function by more than $\Delta f(t)$. The slope intervals S are generally made constant, throughout the generation of a given function, for the present embodiment of the invention. Having these data, the rate at which the $\Delta f(t)$ increments should be generated for each of the slopes, or the fixed time interval, $\Delta t$, associated with each of the slopes can now be determined using the equation:

$$\Delta t_n \approx \frac{(t_n - t_{n-1})}{[f(t_n) - f(t_{n-1})]} / \Delta f(t)$$

Thus the more complicated the function or the higher the degree of accuracy demanded, the larger the number of straight lines that must be used in the approximation and the smaller the incremental values assigned to $\Delta f(t)$.

The output of the preferred embodiment of the invention for generating this function gives a pulse-time representation. It transmits a pulse P in actual physical time for each $\Delta f(t)$ change in the function. The pulse train transmitted by the function generator is shown at the bottom of Figure 1. During the first slope the $\Delta f(t)$ changes will occur at $\Delta t_1$ time intervals, during the second slope at $\Delta t_2$ intervals, etc. Thus for the first period of time S, the output pulses P are spaced $\Delta t_1$ seconds apart; then for the next period of time S they are spaced $\Delta t_2$ seconds apart; etc, for the rest of the slopes of the approximating function.

The basic electronic circuits for generating these pulses P are shown in block diagram in Figure 2 which illustrates a simplified, general set-up of a system using a preferred embodiment of the function generator. Here two electronic circuits are used to obtain the two time quantities $\Delta t_n$ and S. The function counter 10 which is a 24 stage binary counter, produces the pulses, spaced $\Delta t_n$ seconds apart, which represent the function. The slope counter 12 which is a 17 stage binary counter produces pulses, spaced S seconds apart, which represent the time duration of the slopes.

The function counter 10 is triggered with pulses from external pulse generator 14 at a rate of 51,200 cycles per second. For the present embodiment of the invention, the choice of both the operational input pulse rate and the length of the slope intervals S was governed by the need for a 400 cycle signal for the synchronizing of the equipment. By binary multiplication of 400 c.p.s. a nominal input rate of 51,200 c.p.s. was chosen for the counters. Thus this high frequency pulse rate is fed directly into the signal counter 13 comprising 7 binary stages which functions as a rate divider. The 400 cycle output from signal counter 13 is transmitted on signal line 15, through a power amplifier 15a, to a synchronizing motor 17 which drives a tape recorder 18. The 400 cycle output is also fed into slope counter 12, having an additional 17 binary stages, which counts to capacity and feeds an output pulse on lead 11 to control alternate banks of reset switches 16 associated with the function counter 10. The reset switch banks 16, depending on how their switches are set, determine new base numbers of the function counter 10 which change its effective capacity. When the function counter clears it emits a function pulse P which is conveyed on output line 19 to a recording head 20 which impresses the pulse magnetically on tape 21 of tape recorder 18.

The 400 cycle signal from signal counter 13 is thus seen to be synchronized, by the pulse generator 14, with the generation of function pulses P. By using the 400 cycle signal to drive the tape 21, the linear speed of the tape is matched to the temporal spacing of the function pulses P. Thus, by using a controlled 400 cycle source for later playback of the tape, the pulse-time representation of the function can be obtained with the desired accuracy.

This completes a description of the general setup of the equipment utilizing a preferred embodiment of the present invention for obtaining a pulse-time representation of a general function.

Referring to Figure 3, a block diagram of the function counter 10, in Figure 2, and its associated control circuits is shown.

Function counter 10 is of the binary type incorporating 24 modified Eccles-Jordan flip-flop stages. Associated with the counter 10 are the two banks 16a and 16b of reset switches 28a and 28b, respectively. Each of the banks has 24 single pole, double throw reset switches which connect one of the stages of function counter 10 either to ground or to a common reset channel 29a or 29b.

Figure 5 shows a detailed schematic drawing of a typical stage of the function counter 10. The binary flip-flop stage illustrated, made up of triode tubes $V_1$ and $V_2$, is well known and is shown and described here to clearly reveal the connections of the associated circuitry. Tubes $V_1$ and $V_2$ are coupled as is well known, so that their grids and plates are interconnected in flip-flop fashion. In the present arrangement, the grids of the tubes are further connected through individual resistors $R_1$ and $R_2$ to a common point X. This point X in turn is connected to a negative potential source through a resistor $R_3$. Each of the flip-flop stages of the counter 10 has a carry pulse line 27 which is coupled to the plate of the right tube $V_2$ and leads to the common point X of the succeeding flip-flop stage. During counting operations, when the right tube plate has a drop in potential, a negative carry pulse is created for triggering the following stage. Thus, conduction in the right tube $V_2$ of a flip-flop represents the "zero" digit and conduction in the left tube $V_1$ the "one" digit. A neon indicating lamp $L_a$ is connected across the plate load resistor $R_L$ of left tube $V_1$ to give a visual indication of when a stage is holding a "one" digit.

The reset channels 29a and 29b are connected through reset switches 28a and 28b, and coupling condensers $C_1$ and $C_2$ respectively, to the grid of right tube $V_2$. Bleeder resistors $R_4$ and $R_5$ connect the switch side of condenser $C_1$ and $C_2$ respectively to ground. Thus negative reset pulses occurring on either channel 29a or 29b, if the reset switches 28a or 28b associated with a particular flip-flop stage are closed, are able to cut off the tube $V_2$ of the flip-flop and turn on the tube $V_1$ to record a "one" in the stage.

Reset switches 28a and 28b are single pole, double throw switches and are so operated that when not connected to the reset channel contacts they are connected to ground. The reason for this is to prevent a reset pulse on one of the channels from charging the capacity of a switch on the other channel. Since, if this latter switch were to be closed, as when setting up a base number, the flip-flops would perchance be disturbed.

Referring back to Figure 3 it is seen that external pulse generator 14, which may be a free running multi-vibrator circuit, for example, generates negative input pulses at a nominal rate of 51,200 cycles per second. These pulses are made positive by a phase inverter 24. Dependent on the condition of a function counter flip-flop switch 25, an input gate 26 opens to permit the high frequency positive input pulses to be fed into the first flip-flop stage 2⁰ of the function counter 10. Carry lines 27 between the stages of counter 10, as above noted, permit the input pulses to be summed up and indicated in a binary fashion. When the counter 10 fills, the last flip-flop stage $2^{23}$ emits a pulse on output line 31 to a pulse former 32 which feeds a function output pulse on output line 19. The pulse from pulse-former 32 is also fed into a delay circuit 33 which delays the pulse until all the circuits in counter 10 have attained a stable state. The pulse from the delay device 33 is then fed through either of two possible circuits to the switch banks 16a or 16b, dependent on whether reset gate 34a or 34b is open. These reset gates are alternately opened or closed by changes in suppressor grid voltage from rate change flip-flop 36 through D.C. amplifiers 38a or 38b. A rise in suppressor grid potential opens one of the reset gates, thus reset pulses from delay 32 result in a pulse output from the open reset gate. This pulse is inverted in a second pulse inverter 41a or 41b and amplified in reset amplifier 42a or 42b before appearing as an amplified negative pulse on reset channel 29a or 29b, respectively.

Figure 6:
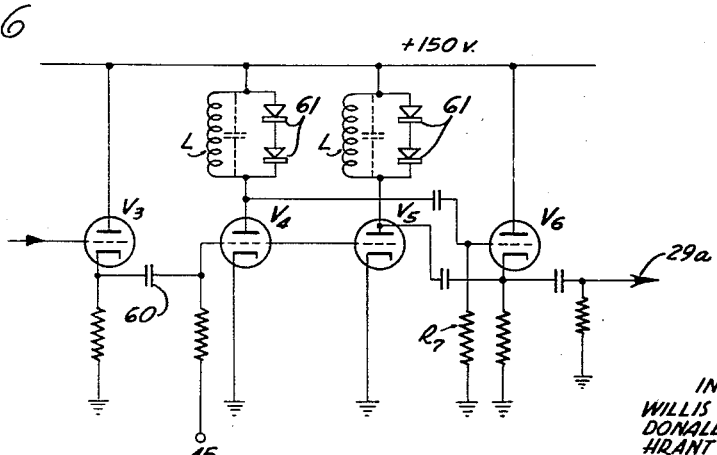
Figure 6 is a detailed schematic drawing of the reset amplifier of Figure 3.

In order to minimize cross-talk and transient effects between the two reset channels, which, as best seen in Figure 5 are both intercoupled at the right grid of the flip-flop, a unique output from reset amplifier 42a or 42b is used for attaining a low impedance, amplified, reset pulse. This arrangement acts to keep the magnitude of the pulse on the unused channel, as a result of cross-talk, very small. Referring to Figure 6 a schematic diagram of one of the reset amplifiers 42 is shown. Here a positive pulse, from the second phase inverter 41, is impressed upon the grid of a cathode follower tube $V_3$ which is normally biased near cutoff. The low impedance output from the cathode of tube $V_3$ is impressed through a coupling capacity 60 on the parallel grids of two triodes $V_4$ and $V_5$. The momentary conducting of tubes $V_4$ and $V_5$ cause a current to circulate in the tank circuits connected to their plates. These tank circuits are formed by inductances L and the natural capacity of their coils as shown by dotted lines in Figure 6. This would normally produce an oscillatory voltage across the inductance L damped only by the resistance in the coil. Crystal diodes 61, however, shunted across each of the tank circuits, damp out all but the first negative loop which is transmitted as a negative pulse from each of the tank circuits to the grid and the cathode, respectively, of a second cathode follower $V_6$. The cathode is connected to one of the banks of reset switches, in this case 29a. The cathode follower $V_6$ has two operating conditions:

When the particular connecting channel 29a is operative, by pulsing negatively both the grid and the cathode simultaneously, an almost unattenuated negative signal can be passed by the cathode follower $V_6$ which is effectively cut off and out of the circuit.

When only the cathode is pulsed, as by a cross-talk signal, when the channel 29a, for instance, is not operating, the cathode is held up by the clamping action of the grid which is grounded through a small resistor $R_7$, so the impedance looking into the cathode follower is very low. Thus the cross-talk pulse is greatly attenuated.

The reset pulse thus triggers the stages of the counter through any of the closed switches 28a or 28b to indicate the digit "one" in that stage.

Referring again to Figure 3 it is noted that an initial setting switch 43 is provided which can be manually set so that a reset pulse in either reset channel 29a or 29b can trigger the function counter flip-flop 25 to close the input gate 26 at the instant a base number is set into counter 10. This arrangement is desired for initially setting the first base number into the counter as will be explained later.

An external start-pulse circuit 46 having a control button 47 is used to start the function generating operation. Since both the function counter 10 and the slope counter 12 must begin counting simultaneously, circuit 46 generates and feeds a start pulse at the same instant to function counter flip-flop 25 and slope counter flip-flop 48. These flip-flop switches control the input gates through which the input pulses pass to the slope and function counter.

Figure 4 shows a simplified block diagram of the signal and slope binary counters 13 and 12 respectively, and their associated control circuits.

External pulse generator 14, in this case, feeds negative pulses directly into the signal binary counter 13 having 7 flip-flop stages similar to the ones described for the function counter 10. Since the 400 cycles per second output of the last stage of counter 13 is to be utilized for a power and a synchronizing signal source, it operates all the while the pulse generator 14 is emitting pulses. This 400 cycles per second output is fed into a substantially sine wave circuit 50 utilizing, for instance, suitable, RC forming circuits in the grid and plate of a tube.

The pulse output from the 7th stage of the signal counter 13 is fed to the 17 stage slope counter 12 through a second input gate tube 52 after being inverted in a phase inverter 51. Input gate tube 52 is controlled by slope counter start-stop flip-flop switch 48. The high potential grid of this latter flip-flop is impressed on the suppressor grid of gate 52 to open it; and the 400 cycle input pulse from the signal counter 13 is impressed on the control grid of gate 52. The slope counter 12 counts these pulses until it reaches the capacity of one of the last five flip-flops stages of the counter 12. Five rate selector switches 55 connect each of the left plates of the last five flip-flop stages, to a common slope output line 56. These five switches 55 enable the slope interval, or a constant rate output of the function pulses, to be chosen in accordance with the time required for the slope counter 12 to count to the binary number represented by the clearing of any one of the last five stages. The slope intervals available with the present embodiment of the invention vary in five binary steps from 20.48 sec. to 5 min. 27.68 sec. The stage capacity, corresponding to the desired time interval, is connected by one of the switches 55 to the common rate line 56. This pulse then passes thru a second pulse former 58 before it is applied to the rate-change flip-flop 36, shown in Figure 3, to gate and route the reset pulses to the alternate switch bank.

A clear switch 59 is provided for clearing the slope counter 12 stages to "zero" previous to operation. As a random number will be generally indicated in the slope counter 12 on initial application of voltage, clear switch 59, which normally is closed to shunt the resistor $R_6$, is opened. Thus common clear line 70 which is connected to each of the right plates of the flip-flop stages by parallel lines 71, depresses the voltage on the righthand plate (carry plate) which makes the left plate more positive and cuts off the left tube. This condition, as previously described, results in a "zero" indication of the stage.

In order to facilitate for the operator, the operation of the function generation, a suitable warning signal circuit may be provided which by ringing a buzzer each time one of the slope intervals is completed, indicates a new switch setting is to be made. As shown in Figure 4, a cathode follower tube 62 connected to rate changing line 11, is driven by a rate-change pulse emitted by slope counter 12. The low impedance output from the cathode follower 62 flips flip-flop 63 to a condition such that its high potential grid opens signal gate 65. Thus the 400 cycle signal on signal line 15, as transmitted by a buzzer line 66, passes through signal gate 65 to actuate a buzzer 67. An external switch 64 is provided for flipping flip-flop 63 to its opposite state to close signal gate 65 and turn off the buzzer.

In addition to the above warning signal, a one-shot multivibrator 69 is also triggered by the output from cathode follower tube 62. The single pulse from the circuit 69 temporarily opens a relay gate 72 which passes a pulse for energizing relay 73. Relay 73 closes a circuit comprised of a D.C. battery 74 and a mechanical counter 75. Counter 75 serves to record the number of slope changes which have occurred since the function pulse operation began. Thus the buzzer 67 and the mechanical counter 75 inform the operator which base reset number is next to be set into switch banks 16, and when this resetting should take place.

The operation of the function generator can best be described by dividing it into two parts; the rate setting procedure, and the operation of function pulse rate generation.

In setting up the function generator, initially, it is required that the base number be properly placed into the function counter 10. The effective capacity of the function counter 10 has previously been defined as the number of pulses required to fill the counter from its reset state or base number. But it is the overflow of the effective capacity which emits a pulse from the 24th stage of the function counter, hence the function counter 10 must receive one pulse more than its effective capacity in order to clear and emit a function pulse. If N is the effective capacity of the counter, it will emit one function pulse for every $N+1$ pulses it receives, which corresponds to every $\Delta t_n$ seconds as shown in Figure 1.

The following relationship then holds between the output rate $R_o$ and the input rate $R_i$ for the function counter 10.

$$R_o = \frac{R_i}{N+1}$$

or $$N = \left(\frac{R_i}{R_o}\right) - 1$$

For example, if a function pulse output rate of 1.00000 p.p.s. is desired from an input rate of 51,200 p.p.s., the effective capacity to be established would be:

$$N = \frac{51,200}{1.00000} - 1 = 51,199$$

To obtain the proper capacity in the counter, the base number set in with the switches 28a or 28b must be the difference between the total capacity and the effective capacity. In the above example, the number N in binary notation would be:

$$N = 111111111110001100000000$$

and the reset base number B for 4 binary stages is easily obtained by the binary complement of N or $$B = 000000000001110011111111$$

Thus by closing the switches 28 in one of the banks corresponding to the position of the "ones" in the number B, the desired base number is set up in the bank.

In order to set the number B of the first slope from the switch bank into the function counter 10, the external pulse generator 14 is put into operation.

The function counter flip-flop 25 is triggered by the external start-pulse circuit 46 into the condition in which it closes the input gate 26 and thus prevents the input pulses from entering function counter 10.

The rate change flip-flop 36 is set by switches (not shown) into the position which opens, for instance, the reset gate 34a for switch bank 16a. Reset switches 28a in switch bank 16a have in the meantime, of course, been set to provide the desired reset base number in the function counter 10 for the first rate to be generated.

The initial setting switch 43 is now moved from its neutral position to contact a. The function counter flip-flop 25 then is triggered by control button 47 so as to open the input gate 26.

A random number will exist initially in the function counter 10 as the result of the initial application of voltage when the equipment is turned on. As the pulses enter the function counter 10 from the pulse generator 14, the function counter 10 fills up and finally carries clear to a zero condition. At the instant of clearing, a reset pulse is emitted from the last stage of counter 10. This reset pulse is delayed slightly in delay device 32 and then passes, in this case, through reset gate 34a and reset amplifier 42a to reset channel 29a. The resulting delayed and amplified reset pulse is thus used to reset the function counter 10 stages to the reset base number set in switch bank 16a.

It is noted that the extension of reset channel 29a connects to contact a of the initial setting switch 43, hence this same reset pulse also triggers the function counter flip-flop 25 and closes the input gate 26, thus leaving the specified reset number in the function counter 10.

At this time the initial setting switch 43 is moved to its neutral position so that it will not pass a reset pulse to trigger function counter flip-flop 25 during the function pulse rate generation operation.

After the initial setting of the desired base number in the function counter 10, the slope counter 12 is cleared by temporarily closing its clear switch 59. The equipment is now in the proper condition to start the generation of the function pulses.

The function pulse rate generation is initiated by pushing control button 47. This triggers the flip-flops 25 and 46 for both the function and slope counter 10 and 12, respectively, so as to ensure turning on both input gates 26 and 52 simultaneously. The start-stop flip-flops 25 and 48 are not used for the subsequent operation.

The pulses from the pulse generator 14 add to the initial reset number in the 24 stage function counter 10. When the counter 10 has filled up, the next pulse causes the counter 10 to carry clear and simultaneously to emit an output pulse from the last stage. This pulse is fed into pulse forming circuit 32 which feeds a pulse to the output line 19 which connects to the tape recorder 18. The output from pulse forming circuit 32 is also fed, as previously described, into a delay device 33 where it is delayed a small amount to allow the carry clear transients in the function counter 10 to die away.

The reset pulse passes through reset gate 34a, in this case, which is held open by the rate change flip-flop 36 and is under the control of the output of the slope counter 12. The reset pulse phase is inverted in second phase inverter 41a and then amplified in reset amplifier 42a. The amplified reset pulse resets the function counter 10 to stages through the 16a switch bank before the next input pulse arrives at the counter 10.

The above operation is repeated in identical fashion throughout the slope interval. During the time that the function counter is resetting through the 16a switch bank, the operator sets up the switches in the 16b bank for the correct reset number for the function pulse rate to be used during the next slope interval.

Simultaneous with the function counter generating function pulses, the slope counter 12 is receiving 400 cycle pulses from the signal counter 13 and is counting to its capacity. One of the rate selector switches 55 is closed throughout the function pulse generating operation, thus selecting a fixed slope interval throughout the generation of a particular function.

At the expiration of a particular slope interval, the rate change flip-flop 36 is triggered by an output pulse from the slope counter 12, having been first passed through a second pulse former 58. The rate-change flip-flop 36 thus opens the opposite gate 34b and routes the output pulse from the function counter 10 to the alternate switch bank 29b. The function counter 10 then resets for the next slope interval in accordance with the setting of the switches in the operative switch bank 29b.

The operation of generating the function pulse may be stopped at any time by triggering the counter start-stop flip-flops 25 and 48 by control button 47; or, in the case of the function counter, by setting initial setting switch 43 and permitting a reset pulse to trigger the flip-flop 25.

The present electronic function generator is a device with many possible advantageous applications in addition to that of precisely-controlled pulse-rate generation. The fact that the time interval between output pulses may be varied in small increments and is maintained with great accuracy makes the present device suitable for use as a precise intervalometer. In addition to use as a general high capacity, high rate counter, it has been utilized in the laboratory as a "packet pulse generator," to supply a predetermined number of pulses to other equipment.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A function generator for generating a function of time comprising a pulse generator, a first binary electronic counter for counting pulses from said generator, two banks of reset switches associated with said first counter, the switches in said banks set to correspond to binary base numbers for said first counter, a second binary electronic counter counting pulses from said pulse generator, gating means for connecting the overflow pulse from said first counter to said banks, whereby said overflow pulse from said first counter resets said first counter in accordance with the reset switches in said connected bank, switching means controlling said gating means, said switching means opening said gating means to the alternate bank when said second counter emits an overflow pulse, means for generating a function output pulse each time said first counter reaches capacity.

2. A function generator for generating a function of time comprising a pulse generator, a first binary counter having a plurality of flip-flop stages for counting pulses from said generator, two banks of reset switches, a reset switch in each of said banks associated with a flip-flop stage of said first counter, said reset switches in each of said banks closed in accordance with a binary base number to be set in said first counter, reset gates for connecting the output of the last flip-flop stage of said first counter to each of said switch banks, a second binary counter having a plurality of flip-flop stages for counting pulses from said generator, a flip-flop switch that flips each time said second binary counter counts from zero to capacity, said reset gates alternately opened by said flip-flop switch, whereby the output of the last flip-flop stage of said first counter is fed through the open reset gate and through the closed reset switches of the associated switch bank to flip the flip-flop stages of the first counter to the corresponding base number, a function pulse fed from the last flip-flop stage of said first counter each time said first counter reaches capacity.

3. Apparatus in accordance with claim 2 wherein a signalling means indicates when said second binary counter reaches capacity.

4. Apparatus in accordance with claim 2 wherein a power pulse output is obtained from an intermediate stage of said second binary counter.

5. Apparatus in accordance with claim 2 wherein a delay circuitry delays the output pulse from the last flip-flop stage of the first counter until the first counter circuits have obtained a stable state.

6. Apparatus in accordance with claim 2 wherein input gates control the feeding of pulses from said pulse generator to each of said first and second counter, each of said input gates being controlled by a separate start-stop flip-flop switch, and a pulse circuit initiated by an external button which simultaneously triggers both said start-stop flip-flop switches.

7. A function generator for generating a function of time comprising a pulse generator, a first binary counter having a plurality of flip-flop stages for counting pulses from said generator, two banks of reset switches, a reset switch in each of said banks associated with a flip-flop stage of said first counter, said reset switches in each of said banks closed in accordance with the binary base number to be set in said first counter, the output of the last flip-flop stage of said first counter connected to each of said switch banks through associated reset gates, a second binary counter having a plurality of flip-flop stages for counting pulses from said generator, a flip-flop switch that flips each time said second binary counter counts from zero to capacity, said reset gates alternately opened by said flip-flop switch, whereby the output of the last flip-flop stage of said first counter is fed through the open reset gate and in parallel through the closed reset switches of the associated switch bank to flip the flip-flop stages of the first counter to the corresponding base number, a function pulse fed from the last flip-flop stage of said first counter each time said first counter reaches capacity, a fixed cycle power pulse output continuously fed from an intermediate stage of said second binary counter, a first input gate controlling the feeding of pulses from said pulse generator to the first counter, a second input gate controlling the feeding of pulses from said intermediate stage to the remaining stages of said second counter, each of said input gates controlled by a separate start-stop flip-flop switch, and a pulse circuit initiated by an external button which simultaneously triggers both said start-stop flip-flop switches.

8. Apparatus in accordance with claim 7 including a tape recorder on which said function pulses are impressed, and wherein said tape recorder is driven by power derived from said intermediate stage of said second binary counter.

9. Apparatus in accordance with claim 7 wherein a two-way switch provides means for connecting said first counter start-stop flip-flop switch to one or the other of said switch banks, whereby said first counter can be stopped whenever it resets through said connected switch bank.

10. Apparatus in accordance with claim 7 wherein an aural warning signal is provided for indicating when a slope change is being made comprising a cathode follower driven by the output from said second counter, a flip-flop triggered by said cathode follower, a signal gate controlled by said flip-flop, a buzzer actuated by the output from said intermediate stage passing through said signal gate, and a manual switch on said flip-flop for closing said signal gate.

11. Apparatus in accordance with claim 7 wherein a means is provided for indicating the number of slope changes made comprising a cathode follower driven by the output from said second counter, a one-shot multivibrator for forming a single broad pulse, a relay gate opened for the duration of said broad pulse, a relay actuated by energy passing through said opened relay gate, and a circuit having a mechanical counter and a D.C. potential closed by said relay.

12. Apparatus in accordance with claim 7 wherein the output of said second counter can be taken from any one of a plurality of later stages of said second counter, whereby the duration of the slopes of the function counter can be varied for any particular function being generated.

13. Apparatus in accordance with claim 7 wherein a clearing circuit is provided for clearing said second counter comprising a common line connected to the carry plates of each of said flip-flops, a resistor shunted by a normally closed clear switch connecting said common line to the positive potential, whereby when said clear switch is opened the resulting low potential on said carry plates makes their respective tubes non-conducting.

14. Apparatus in accordance with claim 7 wherein a reset amplifies the pulse passing through said reset gates comprising a cathode follower, two triodes having both their grids controlled by the output from said cathode follower, a tank circuit connected to the plate of each of said triodes, a diode shunting each of said tank circuits, the plates of said triodes coupled to the grid and the cathode of a second cathode follower, the grid of said second cathode follower biased through a resistor to the negative potential of the supply, and the cathode of said second cathode follower connected to one of said switching banks.

15. Apparatus in accordance with claim 7 wherein said reset switches when in the open position are connected to the negative potential of the supply.

16. Apparatus in accordance with claim 7 wherein a reset switch in each of said switch banks is connected through an individual capacitor to the control grid lead of the carry tube of each flip-flop stage, and the switch side of said capacitor is connected to the negative potential of the supply through a resistor.

References Cited in the file of this patent

J. T. Potter: A Four-Tube Counter Decade, Electronics, June 1944, pp. 110–113.

J. J. Wild: Predetermined Counters, Electronics, March 1947, pp. 120–123.

R. J. Blume: Predetermined Counter for Process Control, Electronics, February 1948, pp. 88–93.